US006994562B2

(12) United States Patent
Suzuki et al.

(10) Patent No.: US 6,994,562 B2
(45) Date of Patent: Feb. 7, 2006

(54) APPARATUS FOR MULTIPLEX COMMUNICATION

(75) Inventors: Norihito Suzuki, Haibara-gun (JP); Hisafumi Maruo, Haibara-gun (JP); Masashi Nagao, Haibara-gun (JP); Masayuki Saito, Kosai (JP); Masayuki Sato, Kosai (JP); Takanori Watanabe, Susono (JP)

(73) Assignee: Yazaki Corporation, Tokyo (JP)

( * ) Notice: Subject to any disclaimer, the term of this patent is extended or adjusted under 35 U.S.C. 154(b) by 509 days.

(21) Appl. No.: 10/280,050

(22) Filed: Oct. 25, 2002

(65) Prior Publication Data

US 2003/0095049 A1    May 22, 2003

(30) Foreign Application Priority Data

Oct. 31, 2001 (JP) ............................ P2001-334572
Jun. 21, 2002 (JP) ............................ P2002-181717

(51) Int. Cl.
*H01R 12/00*    (2006.01)
(52) U.S. Cl. .................... 439/61; 340/870.13; 326/30; 326/82; 361/788
(58) Field of Classification Search ............... 439/61; 361/788; 326/30, 82; 340/870.13
See application file for complete search history.

(56) References Cited

U.S. PATENT DOCUMENTS

| 4,210,885 | A | * | 7/1980 | Ho .............................. 333/238 |
| 4,475,191 | A | * | 10/1984 | James et al. ................. 370/458 |
| 4,682,325 | A | * | 7/1987 | Heys et al. .................. 370/241 |
| 4,811,275 | A | * | 3/1989 | Balogh et al. .............. 710/316 |
| 4,829,244 | A | * | 5/1989 | Tom et al. ................... 324/537 |
| 5,077,630 | A | * | 12/1991 | Bina .......................... 361/119 |
| 5,122,620 | A | * | 6/1992 | Neumann et al. .......... 174/52.4 |
| 5,635,894 | A | * | 6/1997 | Morant ....................... 338/328 |
| 5,722,862 | A |   | 3/1998 | Glathe et al. |
| 6,328,572 | B1 | * | 12/2001 | Higashida et al. ........... 439/61 |
| 6,480,020 | B1 | * | 11/2002 | Jung et al. .................... 326/30 |

FOREIGN PATENT DOCUMENTS

| DE | 198 54 117 A1 | 5/2000 |
| EP | 0 293 197 A2 | 11/1988 |
| EP | 0 491 179 A1 | 11/1991 |
| EP | 0 793 156 A1 | 9/1997 |
| EP | 0 895 899 A2 | 2/1999 |

* cited by examiner

*Primary Examiner*—Albert K. Wong
(74) *Attorney, Agent, or Firm*—Sughrue Mion, PLLC

(57) ABSTRACT

In an apparatus for multiplex communication, a bus line constitutes a bus type network for connecting a plurality of terminal communication equipments. A plug-shaped terminating resistance device is detachably provided at an end of the bus line to reduce reflection noise.

12 Claims, 12 Drawing Sheets

APPARATUS FOR MULTIPLEX COMMUNICATION

BACKGROUND OF THE INVENTION

The present invention is related to an apparatus for multiplex communication. More specifically, the present invention is directed to an improvement in such an apparatus for multiplex communication capable of properly and flexibly accepting arrangement changes of terminating resistance circuits, depending upon differences in grades of vehicles, while increasing an arranging free degree as to the terminating resistance circuits of a bus type network.

In current vehicles, electrical equipments whose operations are controlled by using electric signals are increased. Furthermore, since these electrical equipments own high performance, communications of large amounts of control signals are necessarily required.

Then, since information amounts are increased due to electric signals communicated between such electrical equipments and controller mounted on vehicles, the related cable installing systems for individually installing cables used to transfer signals every electrical equipment own difficulties. That is, since a total number of signal transfer cables is largely increased, the installation works becomes difficult, and at the same time, recovery operations required when failures (e.g., disconnections of cables) happen to occur become difficult.

To solve these difficulties, very recently, such a research has been made so as to reduce quantities of signal transfer cables which are installed in vehicles in such a manner that while communication functions capable of transmitting/receiving information based upon a predetermined communication protocol are provided with a plurality of electric equipments mounted on vehicles, control signals used for these plural electrical equipments are multiplexed with each other and then the multiplexed control signal is transmitted via a commonly-used bus line.

As such an apparatus for multiplex communication, for instance, one apparatus for multiplex communication includes a plurality of hub type joint connectors connecting various sorts of terminal communication equipments, bus lines for constructing a bus type network by connecting these terminal communication equipments and these hub type joint connectors with each other, and terminating resistance circuits of the bus type network.

FIG. 12 and FIG. 13 illustratively show a related joint connector used in the case that bus lines for multiplex communications are connected to a plurality of electrical equipments in a network. This related joint connector is employed so as to control the plural electrical equipments by way of the CAN (Control Area Network) communication, while this CAN communication is popularized as the multiplex communication protocol of networks provided inside vehicles, and this CAN communication protocol is very recently used as the standard vehicle communication protocol.

As illustrated in FIG. 12, this hub type joint connector 1 includes a connector housing 3, connection terminals 5, a printed wiring (circuit) board 7, and a terminating resistance circuit 9. In the connector housing 3, a plurality of connector engaging portions 3a are opened on an upper plane of this connector housing 3. The connection terminals 5 are individually arranged with respect to each of these connector engaging portions 3a. The printed wiring board 7 is stored/provided inside the connector housing 3. In the terminating resistance circuit 9, structural components are mounted on this printed wiring board 7.

Among a plurality of connector engaging portions 3a equipped in the connector housing 3, partial connector engaging portions are used as bus connection ports for connecting multiplex communication-purpose bus lines, whereas the remaining connector engaging portions are used as terminal connection ports for connecting terminal communication equipments.

Electric connections between the connection terminals 5 in each of the connector engaging portions 3a and either bus lines or terminal communication equipments may be carried out via a male connector 11 which is engaged with each of the connector engaging portions 3a, as shown in FIG. 13.

It should be noted that, the terminal communication equipments connected to the connector engaging portions 3a correspond to various sorts of electrical equipments on vehicle which are equipped with interfaces operable in the CAN communications.

The connector housing 3 includes a housing body 15 and a lower cover 16. The housing body 15 has the connector engaging portions 3a on the upper face thereof, and a lower portion of this housing body 15 is opened. The lower cover 15 covers this lower open portion of the housing body. The printed wiring board 7 is stored/held between these housing body 15 and lower cover 16.

Through holes 7b are formed in an insulating board 7a of the printed wiring board 7, through which leads of the connection terminals 5 and leads of electronic components constituting the terminating resistance circuit 9 may be penetrated. Also, a joint circuit is printed by using a copper foil on a rear face of the insulating board 7a. This joint circuit electrically connects the leads to each other, which penetrate these through holes 7b.

This joint circuit formed on the printed wiring board 7 is such a circuit for electrically connecting the connection terminals 5 of the respective connector engaging portions 3a in order that the terminal connection port is branched to be connected to the bus lines.

Since the respective connection terminals 5, the leads of which penetrate the through holes 7b, are connected to the respective through holes 7b by a soldering manner, both fixing of these connection terminals 5 to the printed wiring board 7 and electric connections between these connection terminals 5 and the joint circuit can be established.

The terminating resistance circuit 9 provided on the printed wiring board 7 corresponds to such a circuit which is connected to the joint circuit in order to avoid an occurrence of a problem. This problem is caused by reflections of signals at terminals of the bus lines in the case that this joint connector 1 is used at the terminals of the bus lines.

As shown in FIG. 14, this terminating resistance circuit 9 includes a first resistor 21, a second resistor 22 series-connected to the first resistor 21, and a capacitor 23. One lead of this capacitor 23 is connected between the first resistor 21 and the second resistor 22, and the other lead thereof is grounded. The capacitor 23 has the substantially same impedance as that of the bus lines. It should also be noted that the capacitor 23 has a function capable of reducing noise.

It should also be understood that another apparatus for multiplex communication on vehicle type has been developed in which the terminating resistance circuit 9 is not provided with the joint connector 1, but is provided on a printed wiring board of a control unit (ECU) for transferring control signals supplied to respective terminal communication equipments in a multiplex communication format to bus lines.

On the other hand, it is preferable to realize such an idea that the plural sets of joint connectors 1 used in the apparatus for multiplex communication on vehicle type may be commonly employed even at different mounting positions of these joint connectors used in various vehicles in order to achieve manufacturing-cost reductions due to mass production.

However, when total quantities of electrical equipments to be mounted are changed and distribution paths of bus lines are changed due to differences in grades of vehicles, there are some cases that positions required to set terminating resistance circuits in these bus lines are accordingly changed.

As a consequence, in order to properly accept changes in mounting positions of terminating resistance circuits, in the related apparatus for multiplex communication on vehicle in which the terminating resistance circuit 9 is mounted on the joint connector 1, or the printed wiring board of the control unit(ECU), although the terminating resistance circuit 9 is mounted, the joint connector 1 is used as only a hub type joint connector, resulting in a waste of the terminating resistance circuit 9.

Also, while two different sorts of printed wiring boards is previously prepared, namely, a printed wiring board equipped with the terminating resistance circuit 9 and another printed wiring board without mounting of the terminating resistance circuit 9 is prepared in advance, these printed wiring boards may be selectively and properly employed in the joint connector 1, or in the control unit, depending upon a variation of mounting positions of this terminating resistance circuit 9.

However, in such a case that the terminating resistance circuit 9 is replaced by new one (for maintenance purpose) due to malfunction and/or characteristic deterioration thereof, and in the case that since a new electrical equipment is additionally provided, the existing electrical equipment is removed, the mounting position of the terminating resistance circuit 9 on the bus lines is changed, there is such a problem that cumbersome works are necessarily required. That is, the joint connector 1 itself which has been set to the vehicle must be completely replaced by another joint connector, and/or must be disassembled so as to replace only the existing printed wiring board by another printed wiring board.

SUMMARY OF THE INVENTION

It is therefore an object of the present invention to provide an apparatus for multiplex communication capable of properly and flexibly accepting a change in arranging positions of terminating resistance circuits due to differences in grades of vehicles, while increasing an arranging free degree as to the terminating resistance circuits of a bus type network.

In order to achieve the above object, according to the present invention, there is provided an apparatus for multiplex communication comprising:

a plurality of terminal communication equipments;

a bus line, which constitutes a bus type network for connecting the terminal communication equipments; and a plug-shaped terminating resistance device, detachably provided at an end of the bus line to reduce reflection noise.

Preferably, the apparatus as set forth in claim 2, further comprising:

a joint connector, connected to the bus line so as to constitute the bus type network, and connected to the terminal communication equipments. The terminating resistance device is detachably fitted in the joint connector which is connected at a last stage of the bus line.

In the above configurations, the terminating resistance device is not fixedly installed in a specific joint connector.

As a consequence, even in such a case that a total setting number of the terminal communication equipments connected to the bus line is changed and distribution paths of the bus line are changed due to a difference in grades of vehicles and optional equipments required by users, the apparatus for multiplex communication can readily and quickly accept the change in the arranging positions of the terminating resistance device by executing such a simple operation that an engagement of the plug-shaped terminating resistance device is fitted in the joint connectors provided at the end of the bus line. As a result, such a cumbersome work that the previously set joint connectors are replaced and/or disassembled is no longer required.

Here, it is preferably that the plug-shaped terminating resistance device includes:

a first resistor;

a second resistor, connected to the first resistor in series;

a capacitor, in which one end of the capacitor is connected between the first resistor and the second resistor, and the other end of the capacitor is grounded;

a bus bar, electrically connecting the first resistor, the second resistor, and the capacitor; and an insulating resin housing, covering peripheral portions of the first resistor, the second resistor and the capacitor.

In the configuration, since the insulating resin housing can cover the peripheral portions of the resistors and the capacitor, which constitute the terminating resistance device by way of mold-forming, the insulating resin housing can be easily assembled and also the compact terminating resistance device can be provided in low cost.

Here, it is preferably that the plug-shaped terminating resistance device includes:

a first resistor;

a second resistor, connected to the first resistor in series;

a capacitor, in which one end of the capacitor is connected between the first resistor and the second resistor, and the other end of the capacitor is grounded;

a printed circuit board, on which the first resistor, the second resistor, and the capacitor are mounted; and an insulating resin housing, covering peripheral portions of the first resistor, the second resistor and the capacitor.

In the configuration, since the electric components such as the resistors and the capacitor, which constitute the terminating resistance device are mounted on the printed circuit board, the superior circuit extendibility and the better compactness accepting characteristic can be achieved.

Here, it is preferably that the apparatus further comprising:

a line connector, which is connected to an end of the bus line extended from the joint connector which is connected at the last stage of the bus line. The line connector connects one of the terminal communication equipments. The plug-shaped terminating resistance device is detachably fitted in the line connector.

In the configuration, similar to the joint connector, the plug-shaped terminating resistance device can be fitted in the line connector.

As a consequence, such a compact line connector having a simpler construction than that of a joint connector may be mounted instead of this joint connector in the case that a bus type network is constituted in such a sort of vehicle that, for example, a total number of terminal communication equipments is limited which are additionally connected to a communication apparatus, or since a network scale is small and thus additional connections of terminal communication equipments are not scheduled, additional mounting of the joint connector having the large number of connector engaging portions causes an excessive equipment. As a result, such a network function may be secured which is equivalent to the network function achieved by mounting the joint connector in low cost and in a compact manner.

According to the present invention, there is also provided a plug-shaped terminating resistance device which is detachably provided at an end of a bus line which constitutes a bus type network for connecting a plurality of terminal communication equipments to reduce reflection noise. apparatus for multiplex communication

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Next, an apparatus for multiplex communication on vehicle according to a first embodiment of the present invention will now be described in detail with reference to the accompanying drawings.

Figure 1:
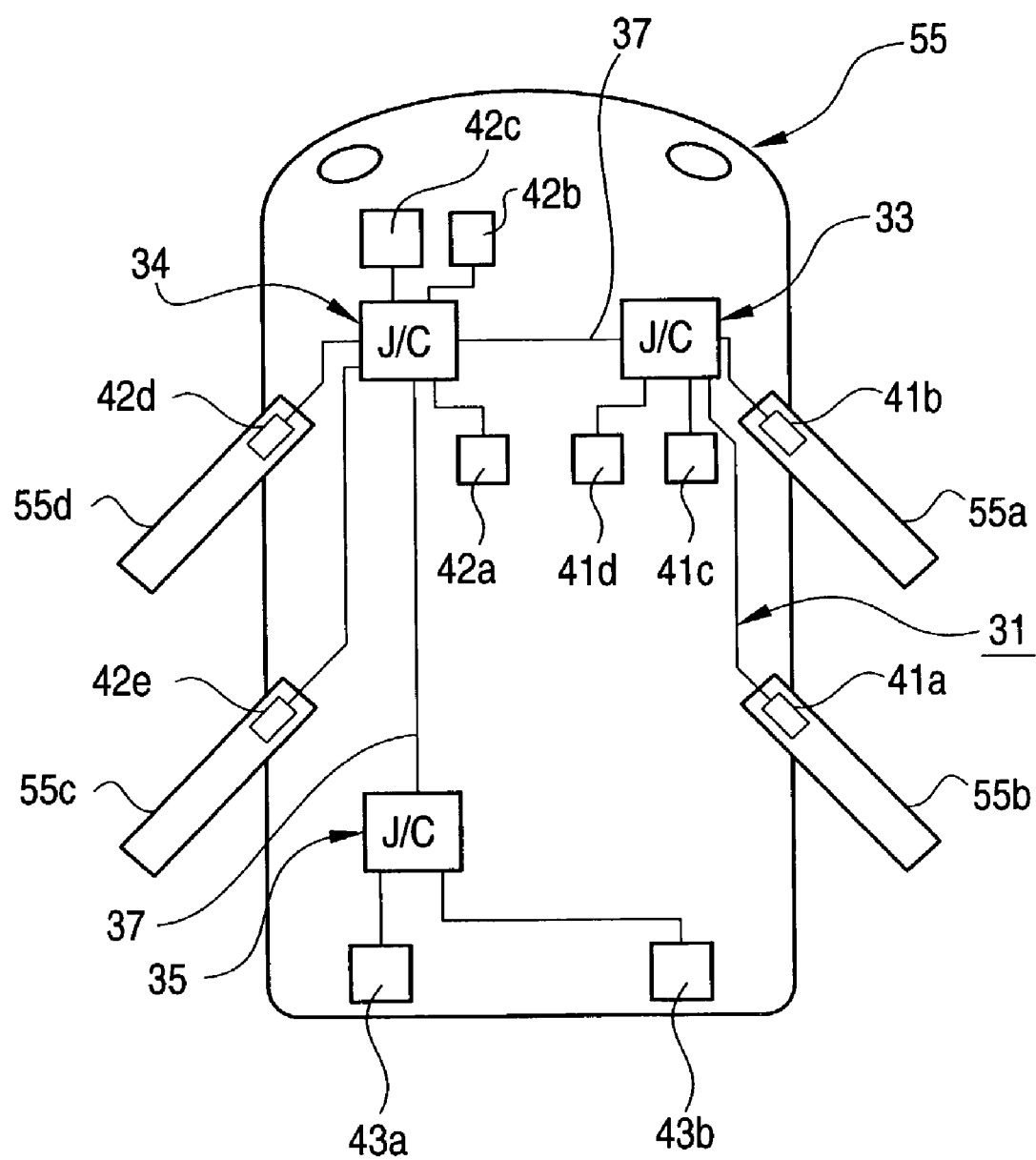
FIG. 1 is a plan view for schematically showing a vehicle which mounts thereon an apparatus for multiplex communication according to an embodiment of the present invention.

FIG. 1 is a plan view for schematically showing a vehicle 55 which mounts thereon a apparatus for multiplex communication 31 according to first embodiment of the present invention.

As indicated n FIG. 1, the apparatus for multiplex communication 31 of this embodiment may control a plurality of electrical instruments by way of the CAN (Control Area Network) communication. This apparatus for multiplex communication 31 includes a plurality of hub type joint connectors 33, 34, 35, a bus line 37, and a terminating resistance circuit unit 39 (see FIG. 2). The plural hub type joint connectors 33, 34, 35 are connected to various sorts of terminal communication equipments 41a to 43b, respectively. The bus line 37 constitutes a bus type network by mutually connecting these terminal communication equipments 41a to 43b to the joint connectors 33, 34, 35 with each other. The terminating resistance circuit unit 39 corresponds to a terminating resistance circuit of the bus type network.

Figure 2:
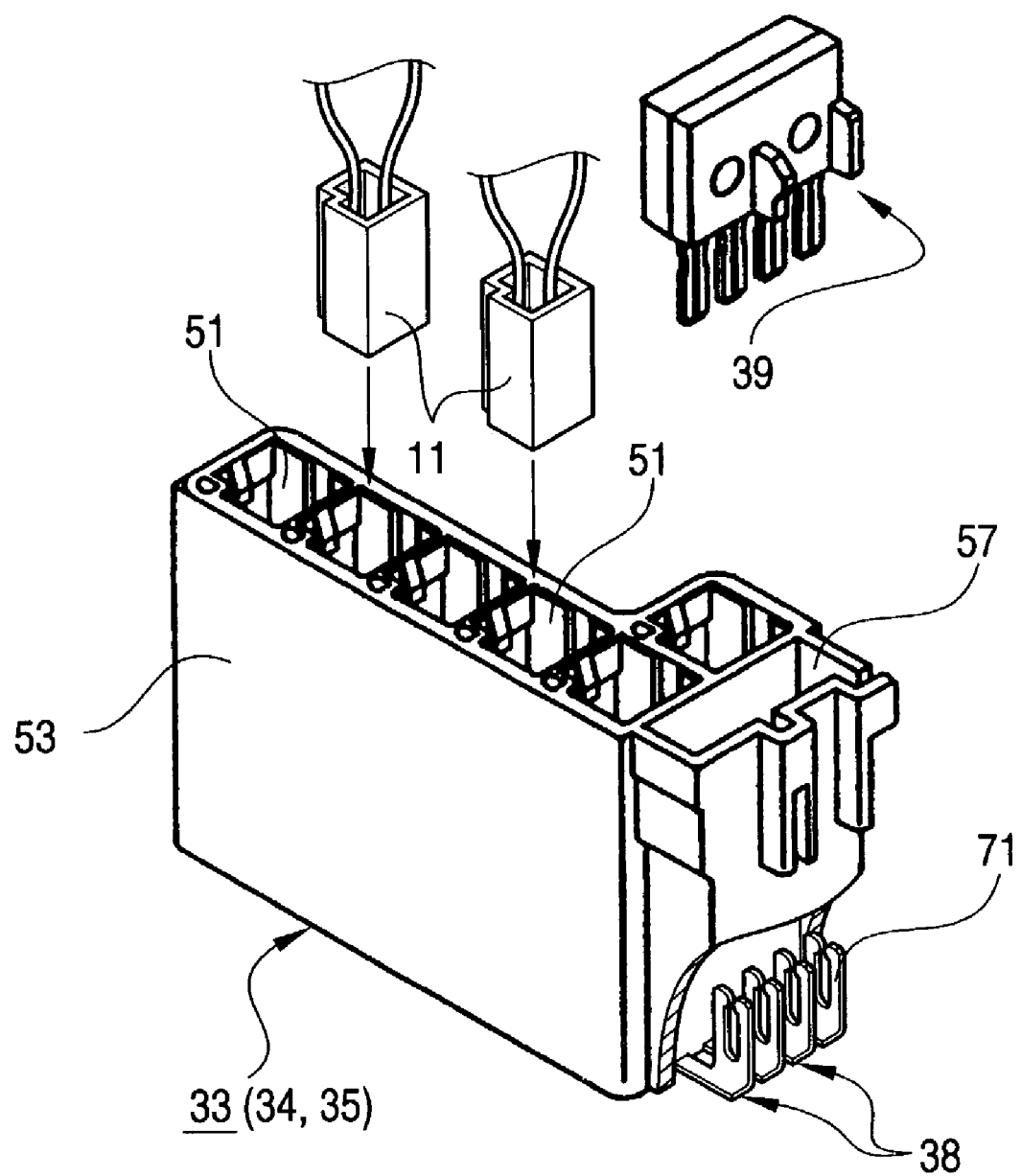
FIG. 2 is a perspective view for indicating a joint connector and a terminating resistor circuit, which are used in the apparatus for multiplex communication shown in FIG. 1.

The respective joint connectors 33, 34, and 35 are the same structures respectively. For instance, as shown in FIG. 2, as to the joint connector 33, a plurality of connector engaging portions 51 are provided on an upper face of a connector housing 53 made of insulating resin. These plural connector engaging portions 51 are engaged with a male connector 11 in a detachable manner.

Among a plurality of connector engaging portions 51 equipped in the connector housing 53, partial connector engaging portions are used as bus connection ports for connecting the multiplex communication-purpose bus lines 37, whereas the remaining connector engaging portions are used as terminal connection ports for connecting the terminal communication equipments 41a to 43b.

It should be understood that the joint connector 33 of this embodiment is constructed of a plurality of chaining bus bars 38, but is not equipped with a printed wiring (printed circuit) board. These plural chaining bus bars 38 are formed with a joint circuit stored/held in the connector housing 53 in an internal body by way of press-forming of a conductive metal plate.

Also, concretely speaking, the terminal communication equipments connected to the respective connector engaging portions 51 of the respective joint connectors 33, 34, 35 correspond to various sorts of electrical equipments on vehicle provided with interfaces for CAN communication purposes, or a control unit for controlling these electrical instruments. In this embodiment, the terminal communication equipments 41a, 41b, 42d, and 42e correspond to, for instance, drive units for powered windows, which are assembled in the respective door units 55a to 55d of the vehicle 55.

The terminating resistance circuit unit 39 is connected to the bus line 37 so as to be driven in a balanced current mode.

Figure 3:
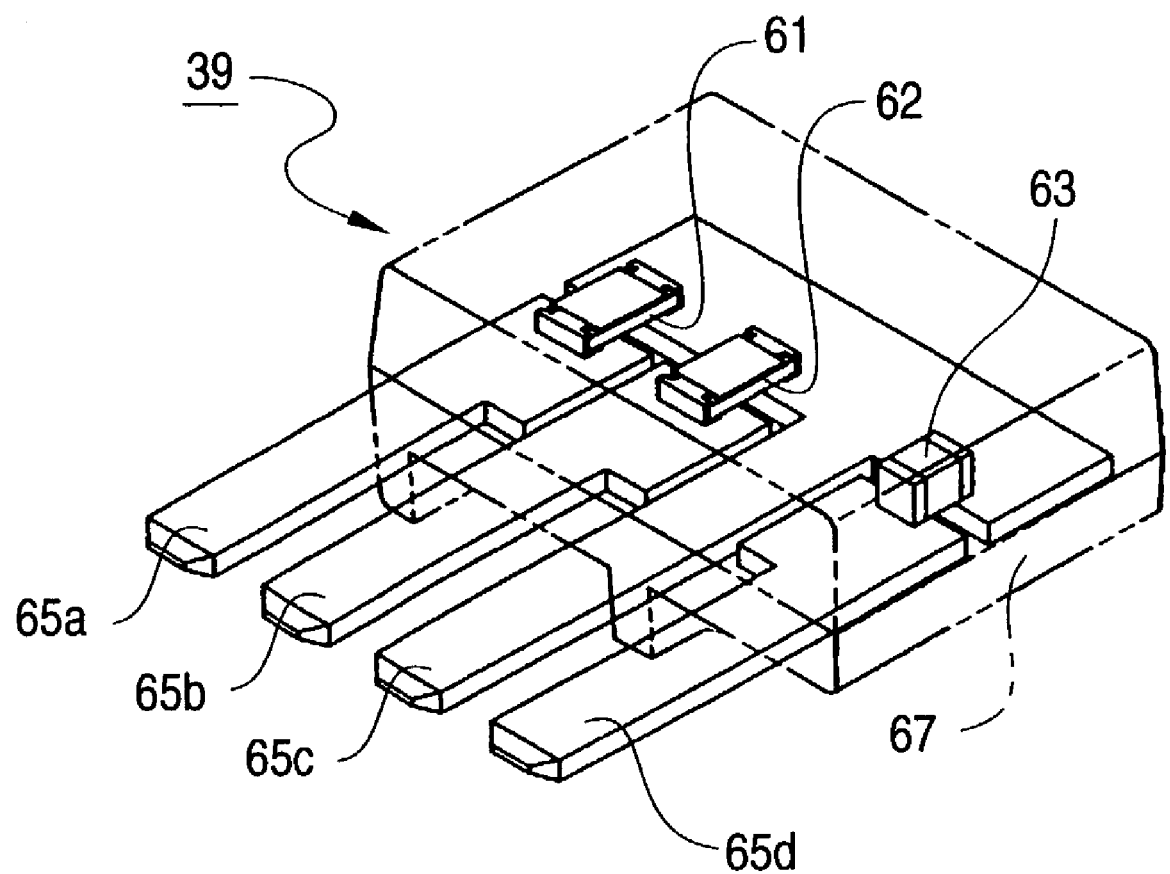
FIG. 3 is a perspective view for indicating a structure of the terminating resistance circuit shown in FIG. 2.

As shown in FIG. 3, the terminating circuit unit 39 of this embodiment is formed as a detachable plug mode unit. The terminating circuit unit 39 includes a first resister 61, a bus bar equipped with the first resistor 61, a second resistor 62 series-connected to the first resistor 61, and a capacitor 63. One lead of this capacitor 63 is connected between the first resistor 61 and the second resistor 62, and the other lead thereof is grounded. The terminating circuit unit 39 further includes an insulating resin housing 67 for covering peripheral portions of the first resistor 61, the second resistor 62, and the capacitor 63 in combination with the bus bar by way of a mold forming manner. The bus bar is equipped with tab terminals 65a to 65d made of metal plates, which constitute connection terminals used when these circuit elements are properly connected to the connector engaging portions 57 of the joint connectors 33, 34, and 35.

As indicated in FIG. 2, a tuning fork terminal 71 is provided in the connector engaging portion 57 of each of the joint connectors 33, 34, and 35, while this tuning fork terminal 71 is used to detachably connect each of the tab terminals 65a to 65d of the terminating resistance circuit unit 39 to chaining bus bar 38. In other words, since the terminating resistance circuit unit 39 is realized as the detachable plug mode which is fitted in the connector engaging portion 57 of each of these joint connectors 33, 34, and 35, this terminating resistance circuit unit 39 is not fixedly installed in a specific joint connector among the joint connectors 33, 34, and 35.

As a consequence, when a total setting number of the terminal communication equipments 41a to 43b connected to the bus line 37 is changed and distribution paths of the bus line 37 are changed due to a difference in grades of vehicles and optional equipments required by users, the apparatus for multiplex communication 31 of this embodiment can readily and quickly accept the change in the arranging positions of the terminating resistance circuit unit 39 by executing such a simple operation that the engagement of the terminating resistance circuit unit 39 constructed of the detachable plug mode is rearranged to be connected to any one of the joint connectors 33, 34, 35 provided at the termination of the bus line 37. As a result, such a cumbersome work that the previously set joint connectors are replaced and/or disassembled is no longer required.

It should be noted that the terminating resistance circuit unit 39 of this embodiment includes the bus bar for electrically connecting the first resistor 61, the second resistor 62, and the capacitor 63 to each other, and the insulating resin housing 67 for covering the peripheral portions of these resistors 61/62 and capacitor 63. As a consequence, the insulating resin housing 67 can cover the peripheral portions of the first resistor 61, the second resistor 62, and the capacitor 63 by way of the mold forming manner, the insulating resin housing 67 can be easily assembled, and thus the compact terminating resistance circuit unit 39 can be provided in low cost.

Figure 4:
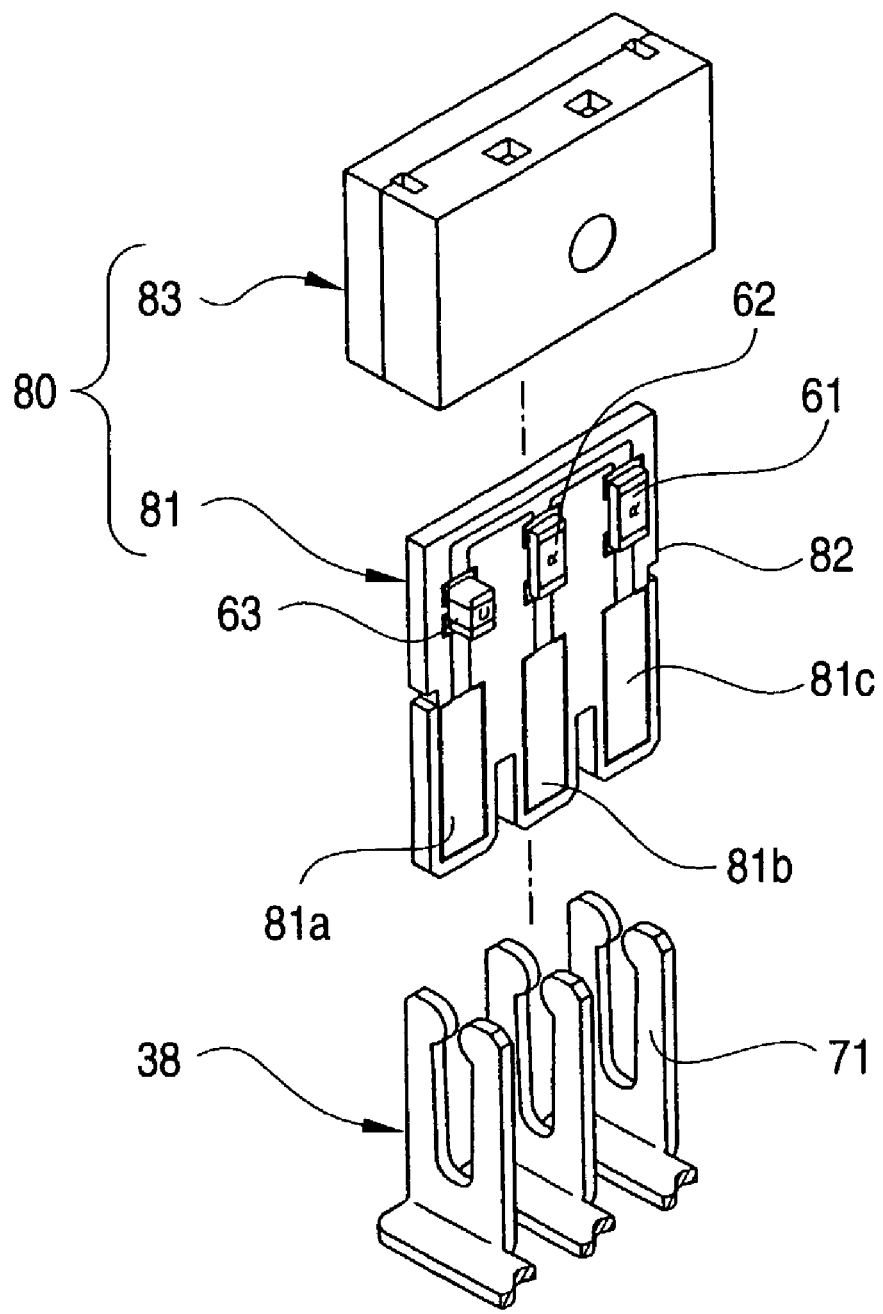
FIG. 4 is an exploded perspective view for indicating another structural example of a terminating resistance circuit related to the apparatus for multiplex communication of the present invention.
Figure 5:
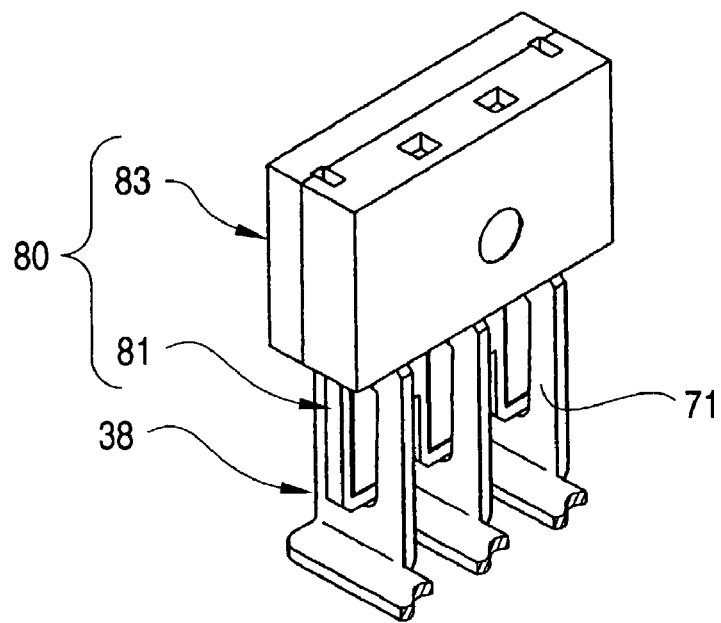
FIG. 5 is a perspective view for representing such a condition that the terminating resistance circuit unit shown in FIG. 4 is engaged/mounted with a tuning fork terminal provided on the side of the joint connector.

FIG. 4 and FIG. 5 illustratively show another structural example of a terminating resistance circuit related to the apparatus for multiplex communication according to a second embodiment of the present invention.

A terminating resistance circuit unit 80 as the terminating resistance circuit shown in the drawings is constructed as a detachable plug mode unit which includes a printed wiring board 81, and an insulating housing 83. The printed wiring board 81 mounts thereon a first resistor 61, a second resistor 62, and a capacitor 63. The insulating housing 83 covers peripheral (surrounding) portions of the first resistor 61, the second resistor 62, and the capacitor 63.

As shown in FIG. 4, as to the printed wiring board 81, a copper foil which is printed on a single plane of an insulating board 82 electrically connects the first resistor 61, the second resistor 62, and the capacitor 63 to each other. Also, conductor portions 81a to 81c of this copper foil, which are formed at one edge portion thereof may constitute a connection terminal which is detachably connected to the tuning fork terminal 71 arranged within the connector engaging portion 57.

The insulating housing 83 stores the printed wiring board 81 into a previously-molded case made of insulating resin thereof.

In other words, similar to the terminating resistance circuit unit 39 of the first embodiment, as shown in FIG. 5, since this terminating resistance circuit unit 80 of the second embodiment is also constituted as the detachable plug mode unit which can be fitted in the connector engaging portion 57 of each of the joint connectors 33, 34, 35, this terminating resistance circuit unit 80 is not fixedly set to a specific joint connector among these joint connectors 33, 34, 35.

As a consequence, when a total setting number of the terminal communication equipments 41a to 43b connected to the bus line 37 is changed and distribution paths of the bus line 37 are changed due to a difference in grades of vehicles and optional equipments required by users, the apparatus for multiplex communication 31 of this embodiment can readily and quickly accept the change in the arranging positions of the terminating resistance circuit unit 80 by executing such a simple operation that the engagement of the terminating resistance circuit unit 80 constructed of the detachable plug mode is rearranged to be connected to any one of the joint connectors 33, 34, 35 provided at the termination of the bus line 37. As a result, such a cumbersome work that the previously set joint connectors are replaced and/or disassembled is no longer required.

Figure 6:
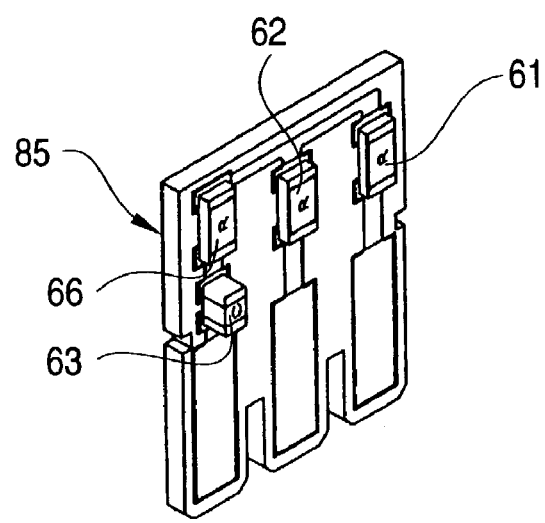
FIG. 6 is an exploded perspective view for indicating an application example of the terminating resistance circuit unit indicated in FIG. 4.

It should also be noted that the terminating resistance circuit unit 80 of this embodiment includes the printed wiring board 81, and the insulating housing 83. The printed wiring board 81 mounts thereon the first resistor 61, the second resistor 62, and the capacitor 63. The insulating housing 83 covers the peripheral portions of the first resistor 61, the second resistor 62, and the capacitor 63. Thus, as shown in FIG. 6, for example, instead of the printed wiring board 81, a function of a terminating resistance circuit may be additionally provided by a slight alternation. Namely, the insulating housing 83 is merely combined with another printed wiring board 83 with which a protection resistor 66 may be equipped. This alternation may realize a superior circuit extendibility and a better compactness characteristic.

It should also be understood that the second embodiment describes such a case that the joint connector 33 is used at the terminal of the bus line 37. In the case that the terminating resistance circuit unit 39 (80) is not required, this terminating resistance circuit unit 39 (80) may not be alternatively installed. As a result, these joint connectors 33, 34, 35 may commonly use such components as the connector housing 53 and the chaining bus bar 38, so that the cost reduction caused by the mass production may be achieved.

FIG. 7 illustratively shows a concrete example capable of properly accepting a specification change by adding, or deleting the joint connectors in such a case that a total number of terminal communication equipments mounted on the vehicle 55 is increased, or decreased due to a difference in grades of vehicles, and in connection therewith, a mounting position of a terminating resistance circuit.

Figure 7A:
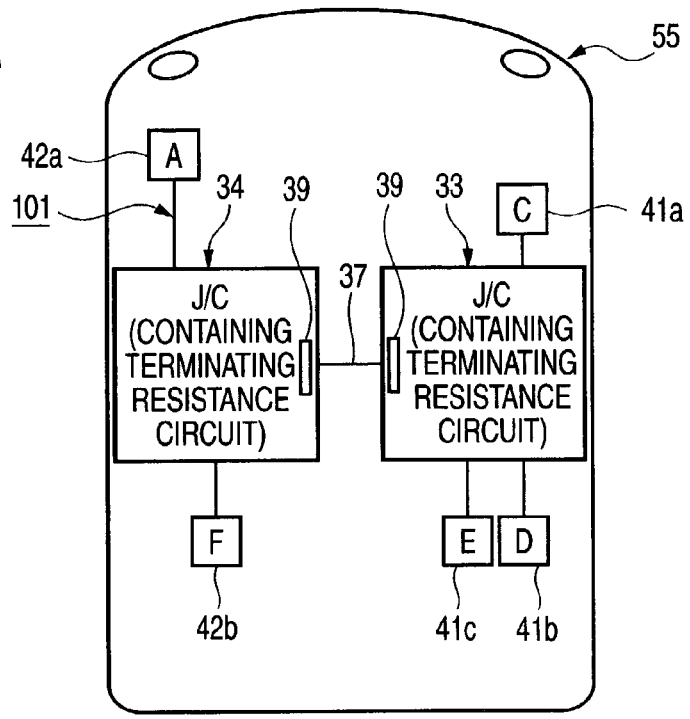
FIG. 7 is a plan view for schematically representing a vehicle indicative of a concrete example of an apparatus for multiplex communication in which a total number of joint connectors is increased/decreased in correspondence with a change in a total quantity of terminal communication equipments.

An apparatus for multiplex communication 101 shown FIG. 7A is arranged in such a manner that five sets of terminal communication equipments 41a, 41b, 41c, 42a, 42b, which are mounted on the vehicle 55, are connected to each other by employing two sets of joint connectors 33 and 34 to constitute a network.

The three sets of terminal communication equipments 41a, 41b, and 41c are connected to the joint connector 33, whereas the two sets of terminal communication equipments 42a and 42b are connected to the joint connector 34. Then, these joint connectors 33 and 34 are connected to each other via the bus line 37.

Also, in order that the respective joint connectors 33 and 34 may constitute terminations of the bus line 37, the terminating resistance circuit unit 39 constructed of the detachable plug mode is mounted on the connector engaging portion 57 of each of the joint connectors 33 and 34.

Figure 7B:
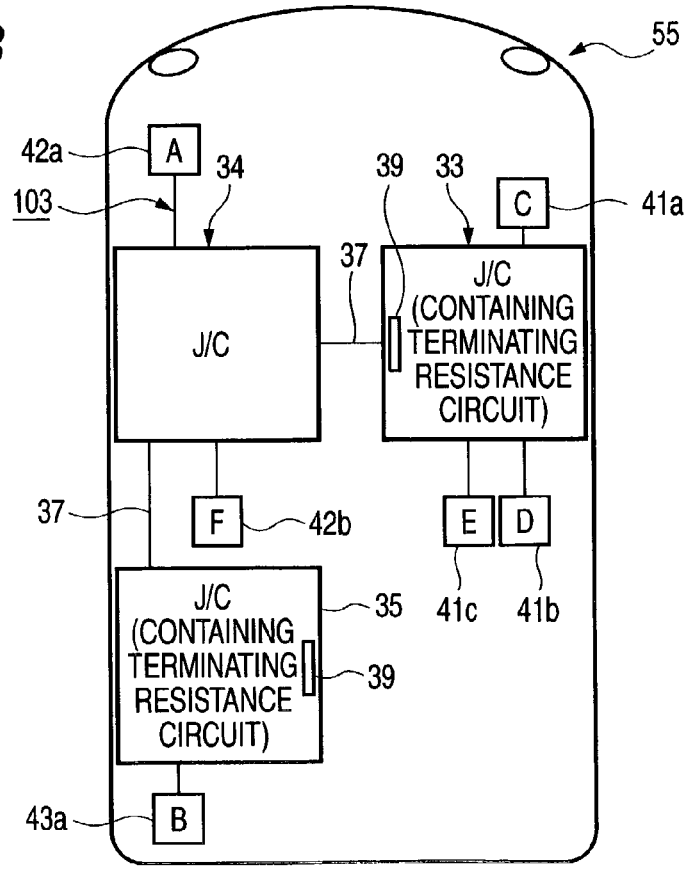

An apparatus for multiplex communication 103 shown in FIG. 7B is arranged in such a manner that another terminal communication equipment 43a mounted on the rear side of the vehicle body is additionally connected via another joint connector 35 to the apparatus for multiplex communication 101 shown in FIG. 7A.

The joint connector 35 to which the terminal communication equipment 43a is connected, is connected with a termination of the bus line 37 extended from the joint connector 34. As a result, both this joint connector 35 and the joint connector 33 may constitute joint connectors of the termination of the bus line 37.

In this case, the respective terminating resistance circuit units 39 are mounted on the connector engaging portions 57 of these joint connectors 33 and 35, whereas the terminating resistance circuit unit 39 is not mounted on the joint connector 34.

As a consequence, for instance, in such a case that the arrangement of the apparatus for multiplex communication 101 shown in FIG. 7A is changed into the arrangement of the apparatus for multiplex communication 103 indicated in FIG. 7B, this arrangement change can be simply and properly accepted in such a manner that the terminating resistance circuit unit 39 mounted on the connector engaging portion 37 of the joint connector 34 is removed, and thereafter, this removed terminating resistance circuit unit 39 is newly engaged with the connector engaging portion 57 of the added joint connector 35.

As previously explained, in the case that the bus type network is constructed, when a length of a branch line branched/connected to the bus line (main line) becomes longer than, or equal to a predetermined length, deteriorations of communication qualities caused by noise and the like will be conducted.

As a consequence, in such a case that a terminal communication equipment is additionally provided at a position separated from the existing joint connector, a line connector equipped with a terminating resistance circuit may be set to a position in the vicinity of a setting position for this terminal communication equipment to be added, and then, this terminal communication equipment may be additionally connected via this line connector. As a result, since the branch line branched/connected to the bus line may be equivalent to the extension of the bus line, lowering of the communication qualities caused by the noise and the like is not conducted.

Figure 8:
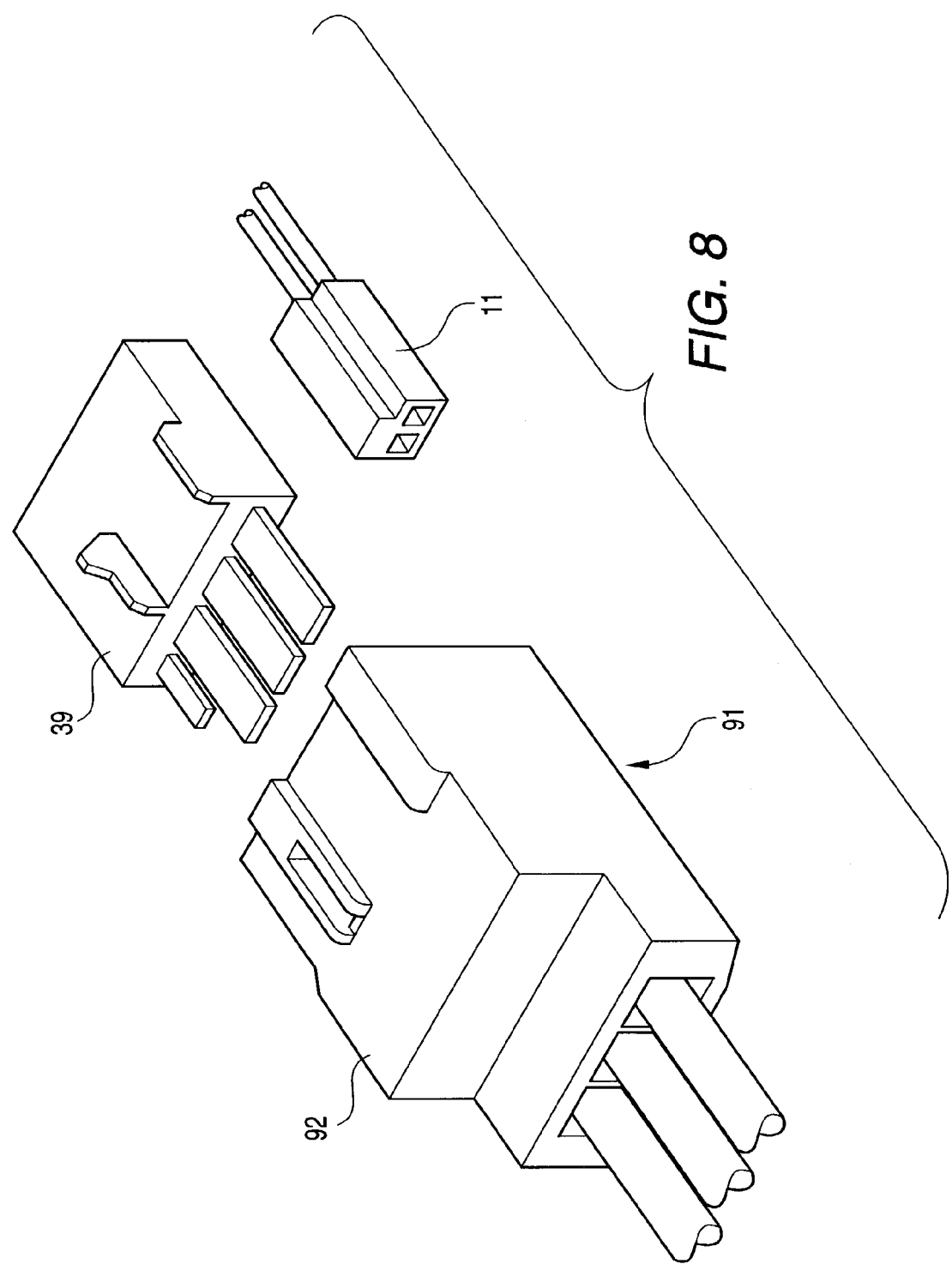
FIG. 8 is a perspective view for representing a line connector used in an apparatus for multiplex communication according to another embodiment of the present invention.
Figure 9:
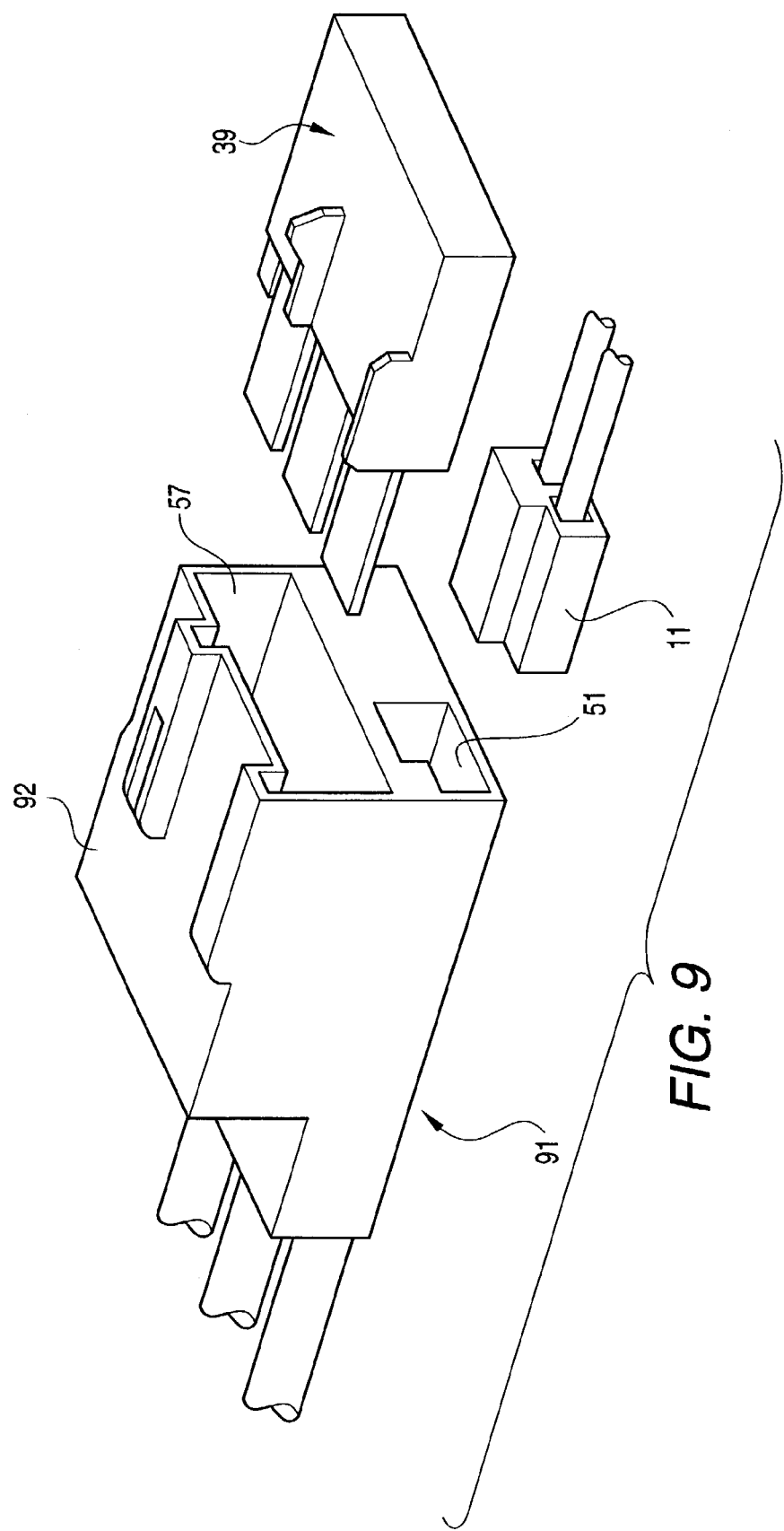
FIG. 9 is a perspective view for showing a terminating resistance circuit unit and the line connector indicated in FIG. 8.

FIG. 8 and FIG. 9 show line connectors which are used to extend a branch line branched/connected to such a bus line (main line).

As shown in FIG. 9, in a line connector 91, a plurality of connector engaging portions 51 and the connector engaging portion 57 are provided with one edge of a connector housing 92 made of insulating resin, while the male connector 11 is detachably engaged/connected to these plural connector engaging portions 51, and the terminating resistance circuit unit 39 is detachably engaged/connected to this connector engaging portion 57.

The connector housing 92 is connected to such a branch line which is branched/connected from the bus line of the joint connector 33 and is then extended, and a plurality of connector engaging portions 51 are used as terminal connection ports capable of connecting various sorts of terminal communication equipments.

In the case that such a line connector 91 is employed, this line connector 91 is not used under such a condition that the joint connectors 33, 34, 35 are designed so as to connect a large number of terminal communication equipments. As a result, a total mounting number of connector engaging portions 51 is smaller than that of these joint connectors 33, 34, 35, and the dimension of these connector engaging portions 51 is made compact.

Figure 10:
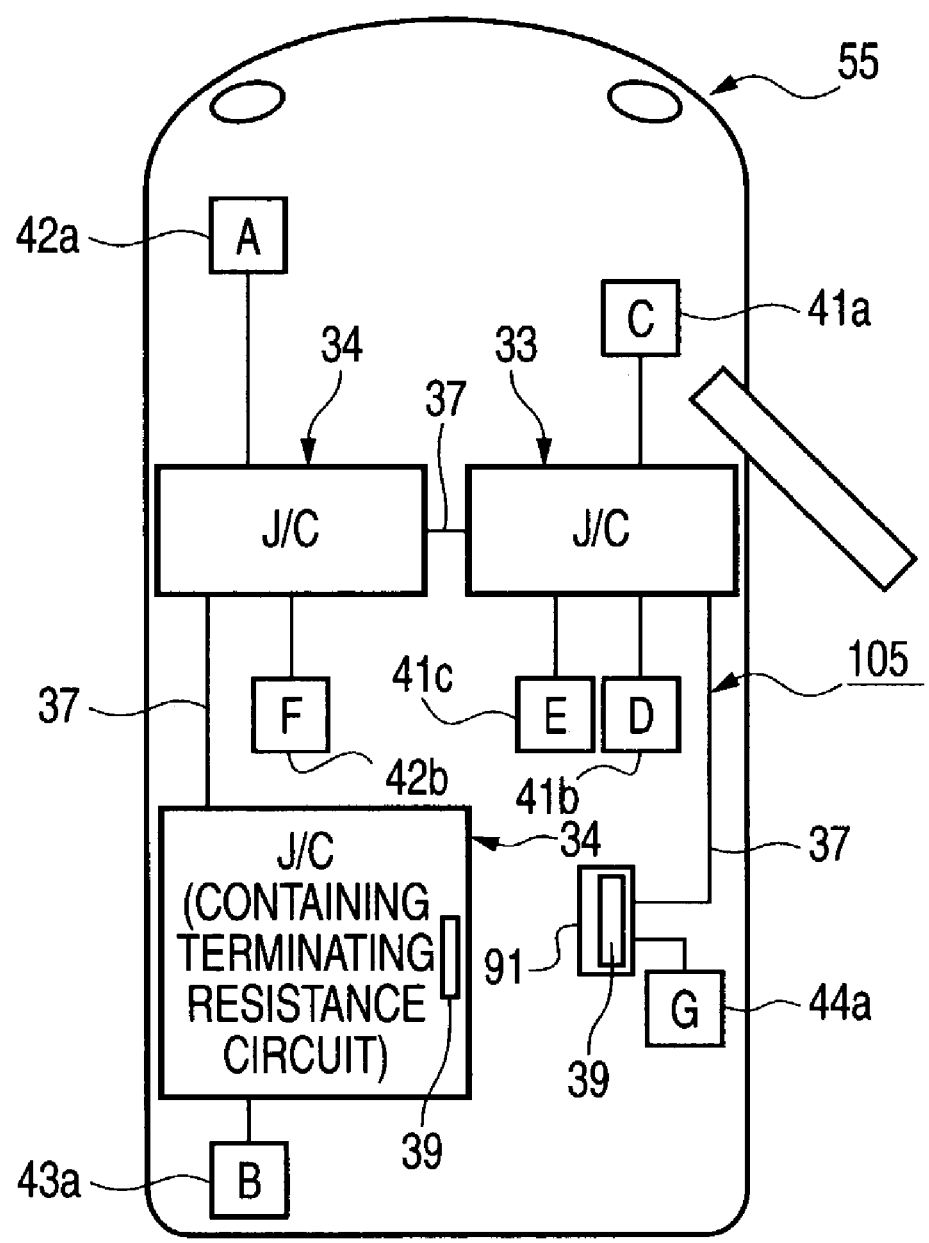
FIG. 10 is a plan view for schematically representing of a vehicle indicative of a concrete example of an apparatus for multiplex communication in which the line connector shown in FIG. 8 is additionally provided in correspondence with a change in a total quantity of terminal communication equipments.

Then, as shown in FIG. 10, in the case that the terminal communication equipment 44a is additionally provided at a rear position of the vehicle 55 separated from the existing joint connector 33, the line connector 91 is set to a position in the vicinity of the setting position for this terminal communication equipment 44a to be added, and then, this terminal communication equipment 44a is additionally connected via this line connector 91.

As a result, since a branch line branched/connected to the bus line of the joint connector 33 in order to additionally equip the terminal communication equipment 44a is connected to the terminating resistance circuit unit 39 of the line connector 91 so that this branch line may constitute the bus line 37, it is possible to prevent lowering of communication qualities caused by the noise and the like.

It should also be noted that an arrangement of an apparatus for multiplex communication 105 shown in FIG. 10 is realized by additionally connecting the terminal communication equipment 44a to the arrangement of the apparatus for multiplex communication 103 indicated in FIG. 7B, and a termination of the bus line 37 is changed from the joint connector 33 into the line connector 91.

Since the termination resistance circuit unit 39 formed in the detachable plug mode can be commonly used by both the joint connectors 33, 34, 35 and the line connector 91, the mounting position of the terminating resistance circuit can be changed in a simple manner by merely reinstalling the terminating resistance circuit unit 39 mounted on the connector engaging portion 57 of the joint connector 33 to the connector engaging portion 57 of the line connector 91.

In other words, the compact line connector 91 having the simpler construction than that of the joint connector 33 may be mounted instead of this joint connector 33 in such a case that, for example, a total number of terminal communication equipments is limited which are additionally connected to the on-vehicle communication apparatus 105, or since a network scale is small and thus additional connections of terminal communication equipments are not scheduled, additional mounting of the joint connector 33 having the large number of connector engaging portions 51 cause an excessive equipment. As a result, such a network function may be secured which is equivalent to the network function achieved by mounting the joint connector 33 in low cost and in a compact manner.

Furthermore, since the terminating resistance circuit unit 39 is detachably mounted, the line connector 91 may be used under such a condition that the terminating resistance circuit unit 39 is not mounted if this terminating resistance circuit unit 39 is not required.

Figure 11:
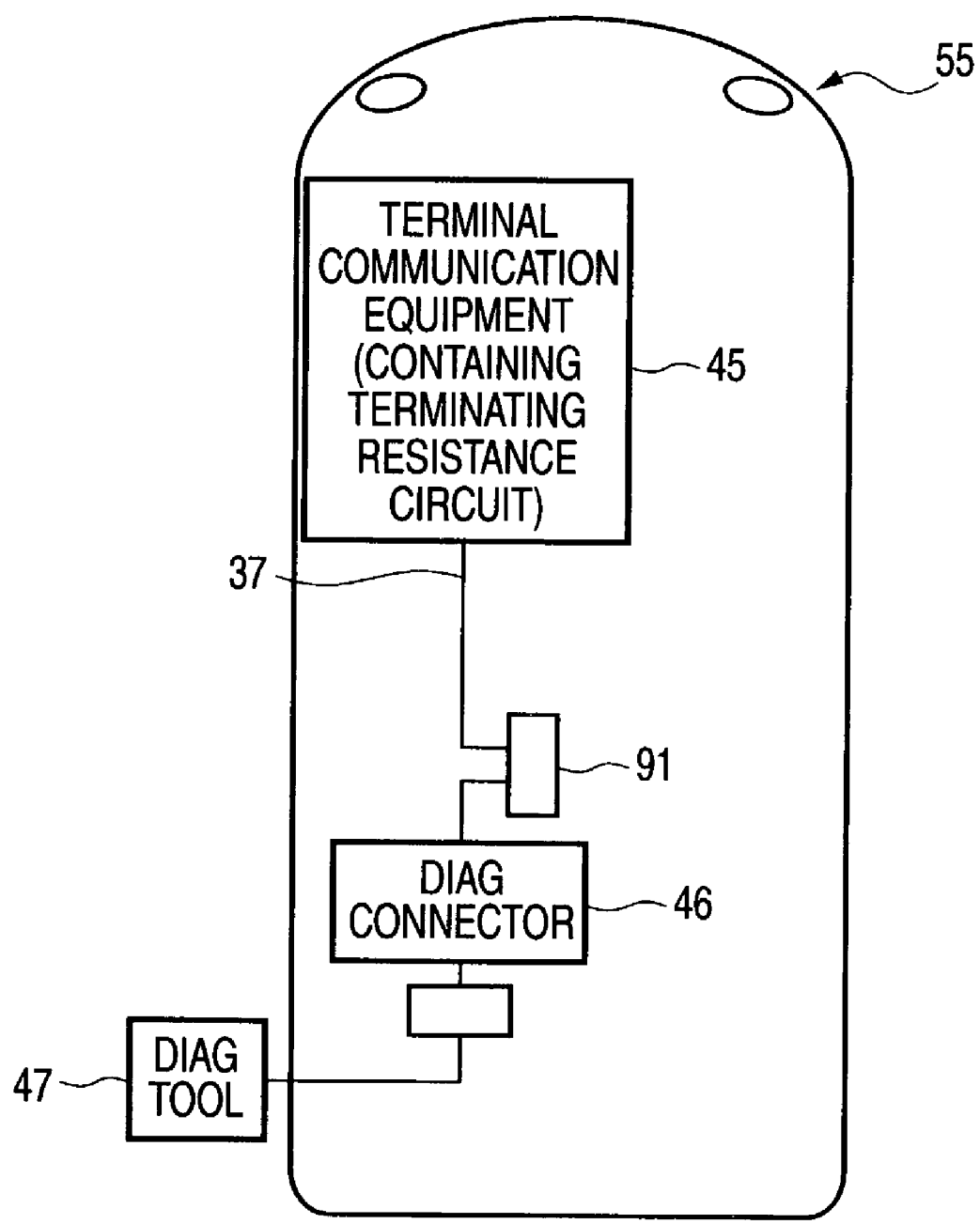
FIG. 11 is a plan view for schematically indicating a vehicle indicative of a concrete network structural example in which the line connector shown in FIG. 8 is effectively utilized when a scale of the network mounted on the vehicle is small.
Figure 12:
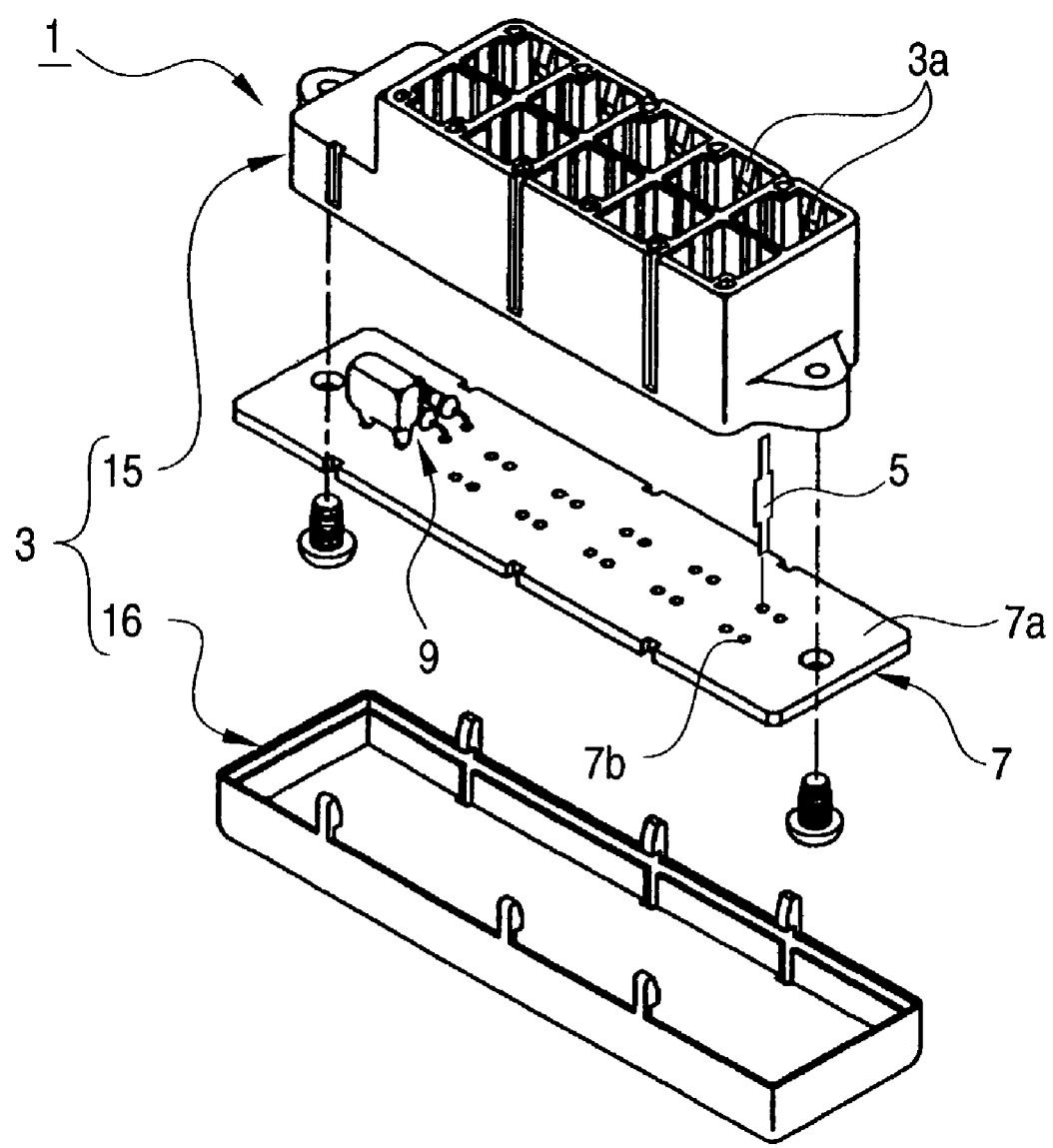
FIG. 12 is an exploded perspective view for showing the related multiplex communication-purpose joint connector.
Figure 13:
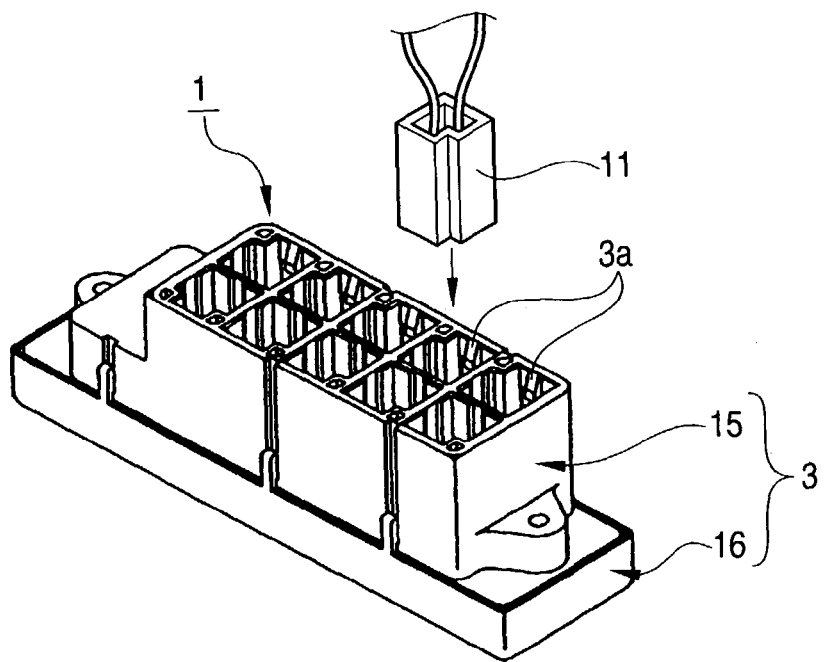
FIG. 13 is an assembled perspective view for representing the multiplex communication-purpose joint connector of FIG. 12.
Figure 14:
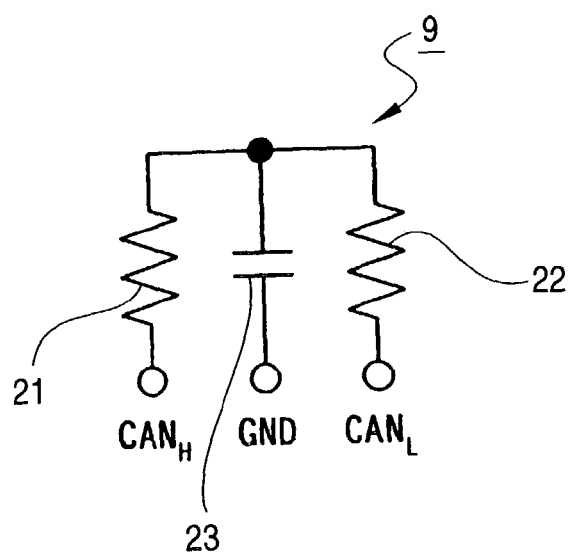
FIG. 14 is a circuit for representing the terminating resistance circuit built in the multiplex communication-purpose joint connector.

For instance, as indicated in FIG. 11, the line connector 91 may be properly utilized in the case that the terminal communication equipments mounted on the vehicle 55 correspond only to a terminal communication equipment 45 equipped with a terminating resistance circuit and a DIAG connector 46 employed so as to construct a network with an external communication appliance 47 externally provided with the vehicle 55, and on the other hand, since the scale of the network mounted on the vehicle 55 is very small, a terminating resistance circuit unit is normally not assembled with the bus line 37 installed within the vehicle 55.

In other words, as shown in FIG. 11, if the line connector 91 is provided, when a terminating resistance circuit unit is required on the side of this vehicle 55 since another relationship with an external communication system is established, or another terminal communication equipment is additionally mounted, then the terminating resistance circuit unit 39 may be engaged/mounted with the line connector 91. As a result, this apparatus for multiplex communication of FIG. 11 may properly accept such a requirement of the terminating resistance circuit unit in a simple manner.

It should also be understood that the apparatus for multiplex communication of the present invention may be apparently applied so as to connect a bus line with communication terminal appliances in a network using a multiplex communication protocol other than the CAN communication.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An apparatus for multiplex communication comprising:
   a plurality of terminal communication equipments;
   a bus line, which constitutes a bus type network for connecting the terminal communication equipments; and
   a plug-shaped terminating resistance device, detachably provided at an end of the bus line to reduce reflection noises,
   wherein the plug-shaped terminating resistance device comprises:
   a first resistor;
   a second resistor, connected to the first resistor in series;
   a capacitor, in which one end of the capacitor is connected between the first resistor and the second resistor, and the other end of the capacitor is grounded; and
   a bus bar, electrically connecting the first resistor, the second resistor, and the capacitor.

2. The apparatus as set forth in claim 1, further comprising:
   a joint connector, connected to the bus line so as to constitute the bus type network, and connected to the terminal communication equipments; and
   wherein the tenninating resistance device is detachably fitted in the joint connector which is connected at a last stage of the bus line.

3. The apparatus as set forth in claim 2, wherein the plug-shaped terminating resistance device further comprises:
   an insulating resin housing, covering peripheral portions of the first resistor, the second resistor and the capacitor.

4. The apparatus as set forth in claim 7, wherein the plug-shaped terminating resistance device further comprises:
   an insulating resin housing, covering peripheral portions of the first resistor, the second resistor and the capacitor.

5. The apparatus as set forth in claim 2, further comprising:
   a line connector, which is connected to an end of the bus line extended from the joint connector which is connected at the last stage of the bus line: and
   wherein the line connector connects one of the terminal communication equipments; and
   wherein the plug-shaped terminating resistance device is detachably fitted in the line connector.

6. A plug-shaped terminating resistance device which is detachably provided at an end of a bus line which constitutes a bus type network for connecting a plurality of terminal communication equipments to reduce reflection noise, said plug-shaped terminating resistance device comprising:
   a first resistor;
   a second resistor, connected to the first resistor in series;
   a capacitor, in which one end of the capacitor is connected between the first resistor and the second resistor, and the other end of the capacitor is grounded; and
   a bus bar, electrically connecting the first resistor, the second resistor, and the capacitor.

7. An apparatus for multiplex communication comprising:
   a plurality of terminal conununication equipments;
   a bus line, which constitutes a bus type network for connecting the terminal communication equipments; and
   a plug-shaped terminating resistance device, detachably provided at an end of the bus line to reduce reflection noise,
   wherein the plug-shaped terminating resistance device comprises:
   a first resistor;
   a second resistor, connected to the first resistor in series;
   a capacitor, in which one end of the capacitor is connected between the first resistor and the second resistor, and the other end of the capacitor is grounded; and
   a printed circuit board, on which the first resistor, the second resistor, and the capacitor are mounted.

8. The apparatus as set forth in claim 7, further comprising:
   a joint connector, connected to the bus line so as to constitute the bus type network, and connected to the terminal communication equipments; and
   wherein the terminating resistance device is detachably fitted in the joint connector which is connected at a last stage of the bus line.

9. The apparatus as set forth in claim 7, further comprising:
   a line connector, which is connected to an end of the bus line extended from the joint connector which is connected at the last stage of the bus line: and
   wherein the line connector connects one of the terminal communication equipments; and
   wherein the plug-shaped terminating resistance device is detachably fitted in the line connector.

10. A plug-shaped terminating resistance device which is detachably provided at an end of a bus line which constitutes a bus type network for connecting a plurality of terminal communication equipments to reduce reflection noise, said plug-shaped terminating resistance device comprising:
- a first resistor;
- a second resistor, connected to the first resistor in series;
- a capacitor, in which one end of the capacitor is connected between the first resistor and the second resistor, and the other end of the capacitor is grounded; and
- a printed circuit board, on which the first resistor, the second resistor, and the capacitor are mounted, wherein the circuit board is contained within the plug-shaped terminating resistance device.

11. The plug-shaped terminating resistance device as set forth in claim 6, further comprising an insulating resin housing, covering peripheral portions of the first resistor, the second resistor and the capacitor.

12. The plug-shaped terminating resistance device as set forth in claim 10, further comprising an insulating resin housing, covering peripheral portions of the first resistor, the second resistor and the capacitor.

* * * * *